(12) United States Patent
Jin et al.

(10) Patent No.: US 9,497,576 B2
(45) Date of Patent: Nov. 15, 2016

(54) NFC CONFIGURATION METHOD, NFC DATA TRANSMISSION METHOD, CONTROLLER, AND NFC CONTROLLER

(71) Applicant: Huawei Device Co., Ltd., Shenzhen (CN)

(72) Inventors: Zhihao Jin, Beijing (CN); Miao Wang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 14/806,230

(22) Filed: Jul. 22, 2015

(65) Prior Publication Data

US 2015/0327004 A1 Nov. 12, 2015

Related U.S. Application Data

(63) Continuation of application No. PCT/CN2013/071029, filed on Jan. 28, 2013.

(51) Int. Cl.
| | | |
|---|---|---|
| H04B 5/00 | (2006.01) | |
| H04L 12/58 | (2006.01) | |
| H04W 4/00 | (2009.01) | |
| H04L 29/08 | (2006.01) | |
| H04W 80/00 | (2009.01) | |

(52) U.S. Cl.
CPC ............ *H04W 4/008* (2013.01); *H04B 5/0031* (2013.01); *H04B 5/0056* (2013.01); *H04L 67/1063* (2013.01); *H04L 69/321* (2013.01); H04L 67/2842 (2013.01); H04W 80/00 (2013.01)

(58) Field of Classification Search
CPC ... H04W 4/003; H04W 4/008; H04W 12/08; G06K 7/10237; G06K 7/10297; H04B 5/0031; H04L 67/2842

USPC ............................ 455/41.1–41.3, 412.1, 514
See application file for complete search history.

(56) References Cited

U.S. PATENT DOCUMENTS

| | | | |
|---|---|---|---|
| 2008/0140667 A1* | 6/2008 | LaBiche | ........... G06F 17/30575 |
| 2008/0244495 A1 | 10/2008 | Kajitani | |
| 2008/0288958 A1* | 11/2008 | Ryoo | ........................ G06F 9/54 |
| | | | 719/313 |

(Continued)

FOREIGN PATENT DOCUMENTS

| | | |
|---|---|---|
| CN | 101136071 A | 3/2008 |
| CN | 101241541 A | 8/2008 |

(Continued)

OTHER PUBLICATIONS

Foreign Communication From a Counterpart Application, European Application No. 13872430.7, Extended European Search Report dated Jan. 21, 2016, 8 pages.

(Continued)

*Primary Examiner* — Simon Nguyen
(74) *Attorney, Agent, or Firm* — Conley Rose, P.C.

(57) ABSTRACT

An NFC configuration method. A controller sends data and a parameter of the data to an NFC module for storage or sends a storage space application instruction to an NFC module, such that storage space is reserved for data in the NFC module. Therefore, when data is sent or received in an NFC High manner, the sent data can be acquired from the NFC module or the received data can be stored in the NFC module without participation of a DH, thereby reducing load of the DH.

12 Claims, 9 Drawing Sheets

(56) References Cited

U.S. PATENT DOCUMENTS

| | | |
|---|---|---|
| 2009/0104875 A1 | 4/2009 | Naniyat |
| 2010/0227553 A1* | 9/2010 | Charrat ................ G06Q 20/341 455/41.1 |
| 2010/0330904 A1* | 12/2010 | Stougaard ............... H04L 67/12 455/41.1 |
| 2011/0226853 A1* | 9/2011 | Soh .................... G06K 7/10237 235/380 |
| 2011/0275316 A1 | 11/2011 | Suumaeki et al. |
| 2012/0045989 A1* | 2/2012 | Suumaki ............... H04W 8/005 455/41.1 |
| 2012/0178366 A1* | 7/2012 | Levy .................. G06K 7/10237 455/41.1 |
| 2012/0238205 A1* | 9/2012 | Reunamaki .............. H04B 5/02 455/41.1 |
| 2013/0093574 A1 | 4/2013 | Miura |
| 2013/0102247 A1* | 4/2013 | Hillan ................ G06K 7/10297 455/41.1 |
| 2013/0212407 A1* | 8/2013 | Walton .................... G06F 21/72 713/190 |
| 2013/0303085 A1* | 11/2013 | Boucher ............... H04W 4/008 455/41.1 |
| 2013/0331029 A1* | 12/2013 | Tang .................... H04W 4/003 455/41.1 |

FOREIGN PATENT DOCUMENTS

| | | |
|---|---|---|
| CN | 101304299 A | 11/2008 |
| CN | 101884178 A | 11/2010 |
| CN | 101958026 A | 1/2011 |
| EP | 2251986 A1 | 11/2010 |
| EP | 2458899 A1 | 5/2012 |
| JP | 2011528886 A | 11/2011 |
| KR | 20120058407 A | 6/2012 |
| WO | 2007052994 A1 | 5/2007 |
| WO | 2010011055 A3 | 1/2010 |

OTHER PUBLICATIONS

Partial English Translation and Abstract of Chinese Patent Application No. CN101304299, Oct. 24, 2015, 4 pages.
Foreign Communication From a Counterpart Application, Chinese Application No. 201380001976.4, Chinese Office Action dated Jan. 28, 2015, 6 pages.
Foreign Communication From a Counterpart Application, PCT Application No. PCT/CN2013/071029, English Translation of International Search Report dated Nov. 7, 2013, 2 pages.
Foreign Communication From a Counterpart Application, PCT Application No. PCT/CN2013/071029, English Translation of Written Opinion dated Nov. 7, 2013, 4 pages.
Partial English Translation and Abstract of Japanese Patent Application No. JPA2011528886, Aug. 26, 2016, 29 pages.
Foreign Communication From a Counterpart Application, Japanese Application No. 2015-554006, Japanese Office Action dated Aug. 2, 2016, 2 pages.
Foreign Communication From a Counterpart Application, Japanese Application No. 2015-554006, English Translation of Japanese Office Action dated Jul. 26, 2016, 3 pages.
Foreign Communication From A Counterpart Application, Korean Application No. 10-2015-7021419, Korean Office Action dated Aug. 25, 2016, 3 pages.
Foreign Communication From A Counterpart Application, Korean Application No. 10-2015-7021419, English Translation of Korean Office Action dated Sep. 7, 2016, 5 pages.

\* cited by examiner

NFC CONFIGURATION METHOD, NFC DATA TRANSMISSION METHOD, CONTROLLER, AND NFC CONTROLLER

CROSS-REFERENCE TO RELATED APPLICATIONS

This application is a continuation of International Application No. PCT/CN2013/071029, filed on Jan. 28, 2013, which is hereby incorporated by reference in its entirety.

TECHNICAL FIELD

The present invention relates to the communications field, and in particular, to a near field communication (NFC) configuration method, an NFC data transmission method, a controller, and an NFC controller.

BACKGROUND

NFC is a technology in which magnetic field induction is used to implement short-distance communication between electronic devices. A peer to peer (P2P) mode is a bidirectional communication mode in the NFC communication. Two NFC terminals can perform bidirectional information exchange in the P2P mode. In the P2P mode, generally the Logical Link Control Protocol (LLCP) is used to establish a data link and perform operations, such as activation, deactivation, and management.

With the development of the NFC technology, an NFC High technology emerges. A characteristic of the NFC High technology is that an NFC controller (NFCC) controls a related operation that is based on an LLCP link, and a controller (also known as a Device Host or a DH) of an electronic device serves as a master controller and is responsible for application-layer data exchange over an LLCP link. In this case, as long as the NFC High technology is used to transmit application-layer data, the DH is required to stay in an operating state. Therefore, the DH is required to participate in NFC P2P data transmission involving application-layer data, which increases load of the DH.

SUMMARY

In view of this, embodiments of the present invention provide an NFC configuration method, an NFC data transmission method, a controller, and an NFC controller, which are intended to resolve a problem that in the existing NFC High technology, NFC P2P data transmission involving application-layer data increases load of a DH.

To achieve the foregoing objective, the embodiments of the present invention provide the following technical solutions.

A first aspect of an embodiment of the present invention provides an NFC configuration method that is applied to a controller of an electronic device, where after the controller of the electronic device configures an LLCP link parameter, the method includes at least one of the following: sending preset data and a parameter of the data to an NFC module of the electronic device so that the NFC module stores the data and the parameter of the data; or sending a storage space application instruction to an NFC module so that the NFC module determines storage space for received data according to the instruction.

A second aspect of an embodiment of the present invention provides another NFC configuration method that is applied to an NFC module of an electronic device, wherein the method includes at least one of the following: receiving and storing preset data and a parameter of the data, where the preset data and the parameter of the data are sent by a controller of the electronic device after an LLCP link parameter is configured; or receiving a storage space application instruction and determining storage space for received data according to the instruction, where the storage space application instruction is sent by a controller of the electronic device after an LLCP link parameter is configured.

A third aspect of an embodiment of the present invention provides an NFC data transmission method that is applied to an NFC controller in an NFC module of an electronic device, wherein the method includes: after an NFC link is established, acquiring data from the NFC module according to a type of the NFC link and a parameter of the data, and sending the data using the NFC link, where the data and the parameter of the data are sent to the NFC module of the electronic device by a controller of the electronic device after an LLCP link parameter is configured, and the data and the parameter of the data are stored by the NFC module; or after an NFC link is established, receiving, according to a type of the NFC link, data sent by a peer device and storing the data in preset storage space in the NFC module, where the preset storage space is determined by the NFC controller according to a received storage space application instruction that is sent by a controller of the electronic device after an LLCP link parameter is configured.

A fourth aspect of an embodiment of the present invention provides a control apparatus that is applied to an electronic device, wherein the apparatus includes an NFC configuring module configured to, after a controller of the electronic device configures an LLCP link parameter, send preset data and a parameter of the data to an NFC module of the electronic device so that the NFC module stores the data and the parameter of the data; and/or after the controller of the electronic device configures the LLCP link parameter, send a storage space application instruction to the NFC module so that the NFC module determines storage space for received data according to the instruction.

A fifth aspect of an embodiment of the present invention provides an NFC apparatus that is applied to an electronic device, wherein the apparatus includes a configuration response module configured to receive and store preset data and a parameter of the data, where the preset data and the parameter of the data are sent by a controller of the electronic device after an LLCP link parameter is configured; and/or receive a storage space application instruction and determine storage space for received data according to the instruction, where the storage space application instruction is sent by the controller of the electronic device after the LLCP link parameter is configured.

A sixth aspect of an embodiment of the present invention provides an NFC control apparatus that is applied to an NFC module of an electronic device, wherein the apparatus includes at least one of an NFC data sending module configured to, after an NFC link is established, acquire data from the NFC module according to a type of the NFC link and a parameter of the data and send the data using the NFC link, where the data and the parameter of the data are sent to the NFC module of the electronic device by a controller of the electronic device after an LLCP link parameter is configured, and the data and the parameter of the data are stored by the NFC module; and an NFC data receiving module configured to, after the NFC link is established, receive, according to the type of the NFC link, data sent by a peer device and store the data in preset storage space in the NFC module, where the preset storage space is determined by the NFC controller according to a received storage space application instruction that is sent by the controller of the electronic device after the LLCP link parameter is configured.

The embodiments of the present invention provide an NFC configuration method. A controller sends data and a parameter of the data to an NFC module for storage or sends a storage space application instruction to an NFC module so that storage space is reserved for data in the NFC module. Therefore, when data is sent or received in an NFC High manner, the sent data can be acquired from the NFC module or the received data can be stored in the NFC module without participation of a DH, thereby reducing load of the DH.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention disclose an NFC configuration method and a controller, where the core invention is that a controller of an electronic device sends, to an NFC module, data that is sent in an NFC high manner and sends a storage space application instruction to the NFC module so as to reserve storage space for received data in the NFC module. Based on the foregoing configuration method and controller, embodiments of the present invention disclose an NFC data transmission method and an NFC controller. When an electronic device transmits data using NFC high, the NFC controller may directly acquire the sent data from an NFC module or store the received data in reserved storage space in an NFC module. Therefore, participation of a controller of the electronic device is not required when data is transmitted using the NFC high.

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
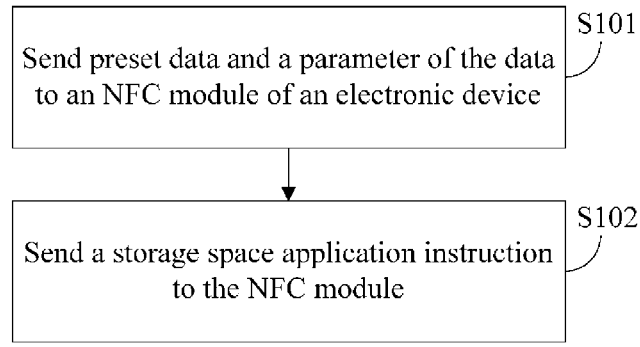
FIG. 1 is a flowchart of an NFC configuration method disclosed by an embodiment of the present invention.

An NFC configuration method disclosed by an embodiment of the present invention is applied to a controller of an electronic device. After the controller of the electronic device configures an LLCP link parameter, as shown in FIG. 1, the method includes at least one of the following steps.

S101. Send preset data and a parameter of the data to an NFC module of the electronic device.

The step is intended to enable the NFC module to store the data and the parameter of the data.

In this embodiment, the preset data is application-layer data preset by a user. An implementation procedure of sending preset data and a parameter of the data to an NFC module of the electronic device may be sending the preset data and the parameter of the data to the NFC module of the electronic device after a data transfer instruction input by the user is received or sending the preset data and the parameter of the data to the NFC module of the electronic device when an electric quantity of the electronic device is lower than a preset value or sending the preset data and the parameter of the data to the NFC module of the electronic device when a data transfer instruction input by the user is received and an electric quantity of the electronic device is lower than a preset value.

It should be noted that the application-layer data may be a data set or a set (such as a Java Applet) of instructions and data.

The data transfer instruction input by the user may include transfer data preset by the user. For example, before a user goes out, the user determines a telephone number of an emergency contact as transfer data. The preset value may be a value that is set according to a total electric quantity of the electronic device. For example, the preset value is 10% of the total electric quantity of the electronic device.

Figure 2:
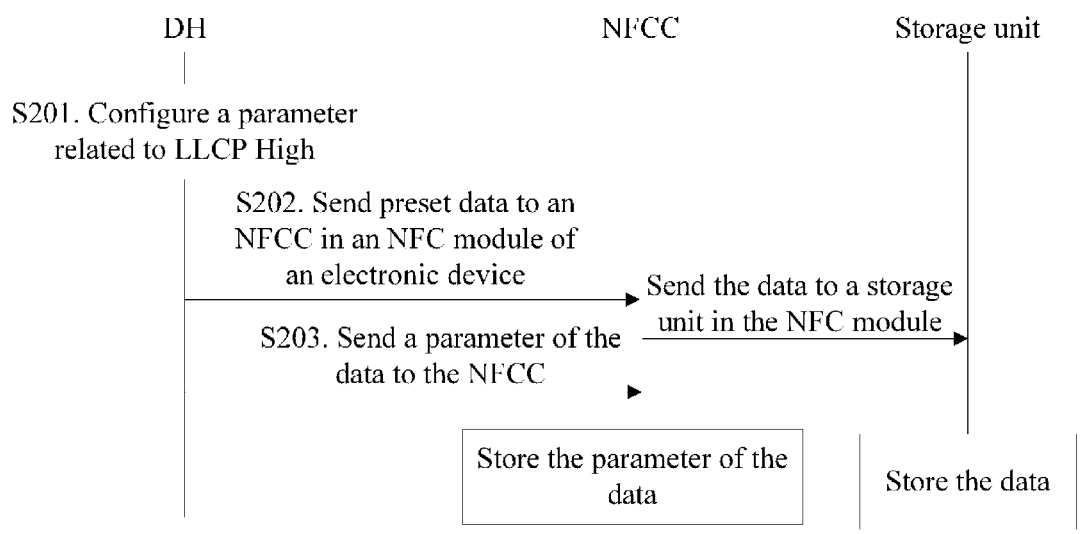
FIG. 2 is a flowchart of an implementation manner in which a controller DH sends preset data and a parameter of the data to an NFC module of an electronic device in the NFC configuration method disclosed by an embodiment of the present invention.

In this embodiment, as shown in FIG. 2, an implementation manner in which the controller DH of the electronic device configures an LLCP link parameter and sends preset data and a parameter of the data to the NFC module of the electronic device includes the following steps.

S201. The DH configures a parameter related to LLCP High.

The configuration procedure in this embodiment is the same as that in the prior art and is used to configure a parameter related to LLCP link establishment.

S202. The DH sends the preset data to an NFCC in the NFC module of the electronic device so that the NFCC sends the data to a storage unit in the NFC module for storage.

S203. The DH sends the parameter of the preset data to the NFCC so that the NFCC stores the parameter of the data.

In this embodiment, the storage unit in the NFC module may be a security element (SE) in the NFC module. Generally, the SE is a module that is configured to store NFC user data and a running environment. The storage unit in the NFC module may also be a storage unit in the NFCC, that is, the NFCC has a storage function.

That is, in this implementation manner, the DH sends both the preset data and the parameter of the data to the NFCC, and the NFCC stores the data in the NFCC or stores the data in the SE in the NFC module and stores the parameter of the data in the NFCC.

The procedure in which the NFCC stores the data in the storage unit in the NFC module is described in the following embodiments, and details are not described herein again.

Figure 3:
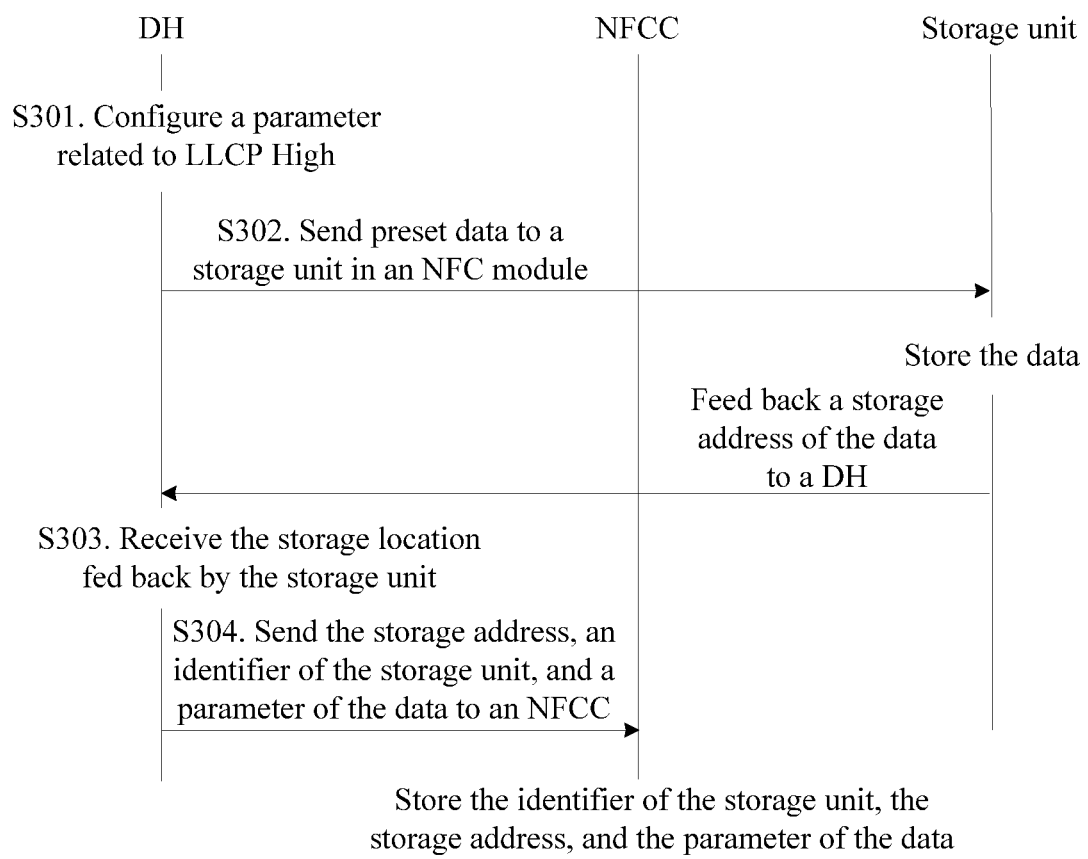
FIG. 3 is a flowchart of another implementation manner in which a controller DH sends preset data and a parameter of the data to an NFC module of an electronic device in the NFC configuration method disclosed by an embodiment of the present invention.

In addition, as shown in FIG. 3, another implementation manner in which the controller DH of the electronic device configures an LLCP link parameter and sends preset data and a parameter of the data to the NFC module of the electronic device includes the following steps.

S301. The DH configures a parameter related to LLCP High.

S302. The DH sends the preset data to a storage unit in the NFC module.

Similar to the foregoing implementation manner, the storage unit in the NFC module may be an SE or a storage unit in an NFCC.

After receiving the data, the storage unit stores the data and feeds back a storage address of the data to the DH.

S303. The DH receives a storage address fed back by the storage unit.

S304. The DH sends the storage address, an identifier of the storage unit, and the parameter of the data to an NFCC so that the NFCC stores the identifier of the storage unit, the storage address, and the parameter of the data.

In this embodiment manner, the DH directly sends the preset data to the SE or the storage unit in the NFCC, and after receiving feedback from the SE or the storage unit in the NFCC, sends feedback information and the parameter of the data to the NFCC.

In this embodiment, the parameter of the preset data includes at least a service access point (SAP), and besides, may further preferably include a link service class (LSC), and the like.

In the foregoing two implementation manners, the SAP may be a contact, a Short Message Service (SMS) message, a photo, a coupon, or the like. The LSC may be connection-oriented (CO), connectionless (CL), or connection-oriented and connectionless (CO/CL).

Returning to FIG. 1, S102. Send a storage space application instruction to the NFC module so that the NFC module determines storage space according to the instruction.

Sending a storage space application instruction to the NFC module may include sending the storage space application instruction to the NFC module after a data transfer instruction input by a user is received; or sending the storage space application instruction to the NFC module when an electric quantity of the electronic device is lower than a preset value; or sending the storage space application instruction to the NFC module when a data transfer instruction input by a user is received and an electric quantity of the electronic device is lower than a preset value.

Figure 4:
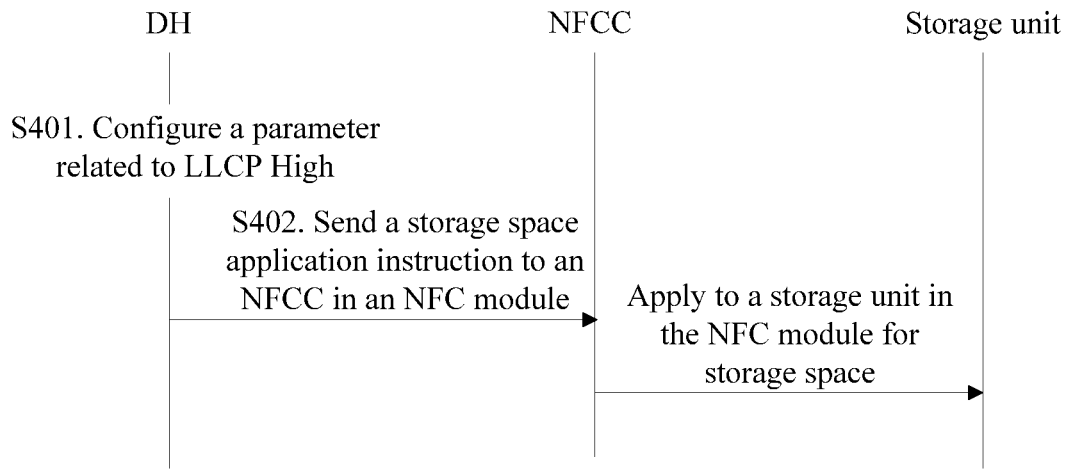
FIG. 4 is a flowchart of an implementation manner of sending a storage space application instruction to an NFC module in the NFC configuration method disclosed by an embodiment of the present invention.

As shown in FIG. 4, an implementation manner in which the DH configures an LLCP link parameter and sends a storage space application instruction to the NFC module includes the following steps.

S401. The DH configures a parameter related to LLCP High.

S402. The DH sends the storage space application instruction to an NFCC in the NFC module.

The storage space instruction includes a storage space parameter, and the storage space parameter includes at least a space capacity and an SAP, and besides, may further include an LSC.

After receiving the storage space application instruction, the NFCC applies to a storage unit in the NFC module for storage space. A step in which the NFCC applies to the storage unit for the storage space is described in the following embodiments.

The storage unit in the NFC module may be an SE or may be a storage unit in the NFCC. That is, the DH sends the instruction to request the NFCC to apply for the storage space. After receiving the storage space application instruction, the NFCC may apply to the SE for the storage space or may apply to the storage unit of the NFCC for the storage space.

Figure 5:
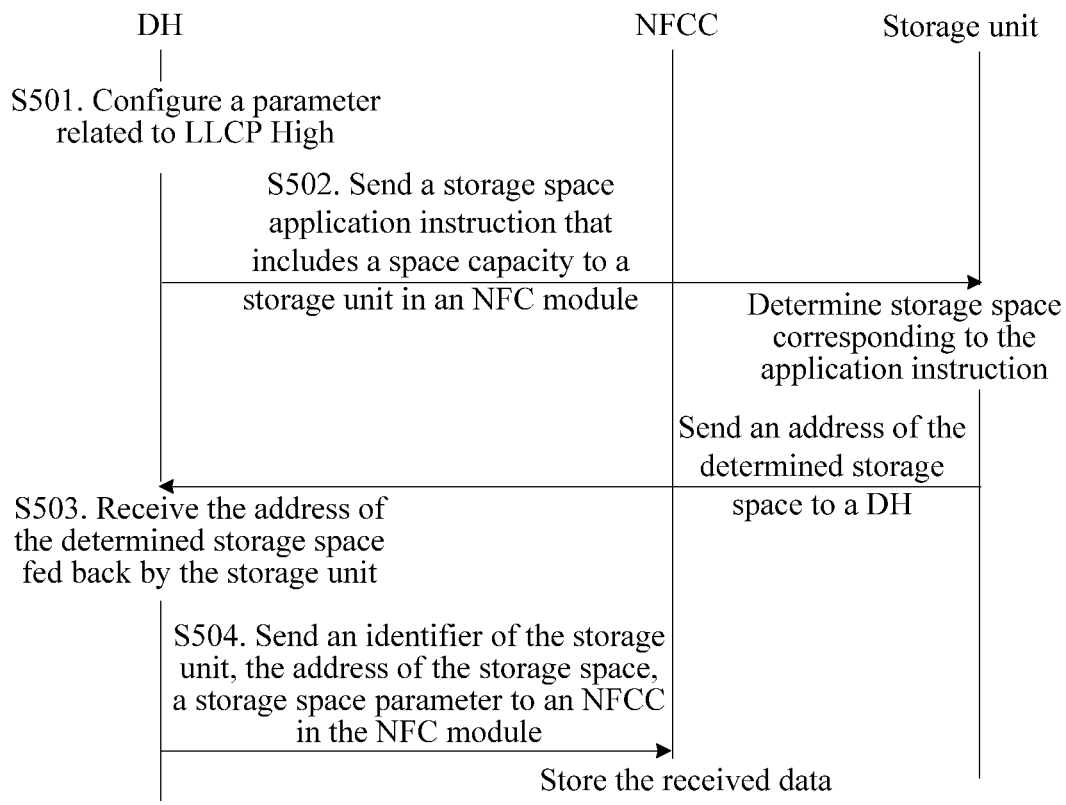
FIG. 5 is a flowchart of another implementation manner of sending a storage space application instruction to an NFC module in the NFC configuration method disclosed by an embodiment of the present invention.

As shown in FIG. 5, another implementation manner in which the DH configures an LLCP link parameter and sends a storage space application instruction to the NFC module includes the following steps.

S501. The DH configures a parameter related to LLCP High.

S502. The DH sends the storage space application instruction that includes a space capacity to a storage unit in the NFC module. Likewise, the storage unit may be an SE or a storage unit in an NFCC.

After receiving the application instruction, the storage unit determines storage space corresponding to the application instruction, that is, a capacity of the determined storage space is the same as the space capacity included in the application instruction; and sends an address of the determined storage space to the DH.

S503. The DH receives an address of determined storage space fed back by the storage unit.

S504. Send an identifier of the storage unit, the address of the storage space, and a storage space parameter to an NFCC in the NFC module.

After receiving the foregoing data, the NFCC stores the data.

The storage space parameter includes at least an SAP, and besides, may further include an LSC.

According to the NFC configuration method in this embodiment, configuration is performed on an NFC module before NFC data transmission. Compared with an existing NFC configuration method, according to the method in this embodiment, in addition to general configuration performed on the NFC, a DH further stores preset data in the NFC module, or applies to the NFC module for storage space, such that the NFC module implements some functions of the DH to a certain degree. Therefore, at an NFC data transmission stage, functions of the DH for sending and storing application-layer data can be implemented by the NFC module. Therefore, participation of the DH is not required. When the DH cannot work for some reasons, the NFC module can still perform data transmission.

Figure 6:
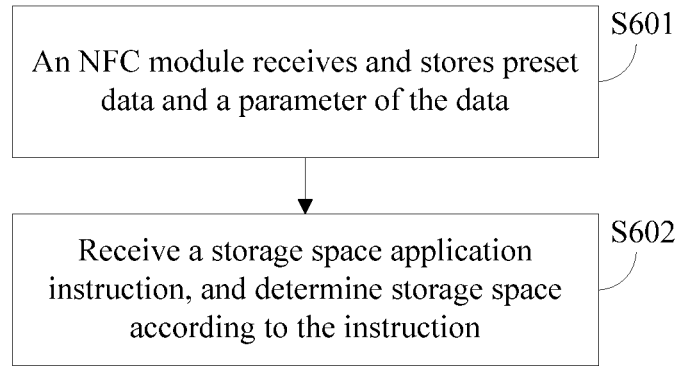
FIG. 6 is a flowchart of another NFC configuration method disclosed by an embodiment of the present invention.

The method in the foregoing embodiment is mainly described from a perspective of a controller of an electronic device. An embodiment of the present invention discloses another NFC configuration method that is applied to an NFC module of the electronic device. As shown in FIG. 6, the method includes at least one of the following steps.

S601. The NFC module receives and stores preset data and a parameter of the data.

The preset data and the parameter of the data are sent by a controller of the electronic device after an LLCP link parameter is configured.

Figure 7:
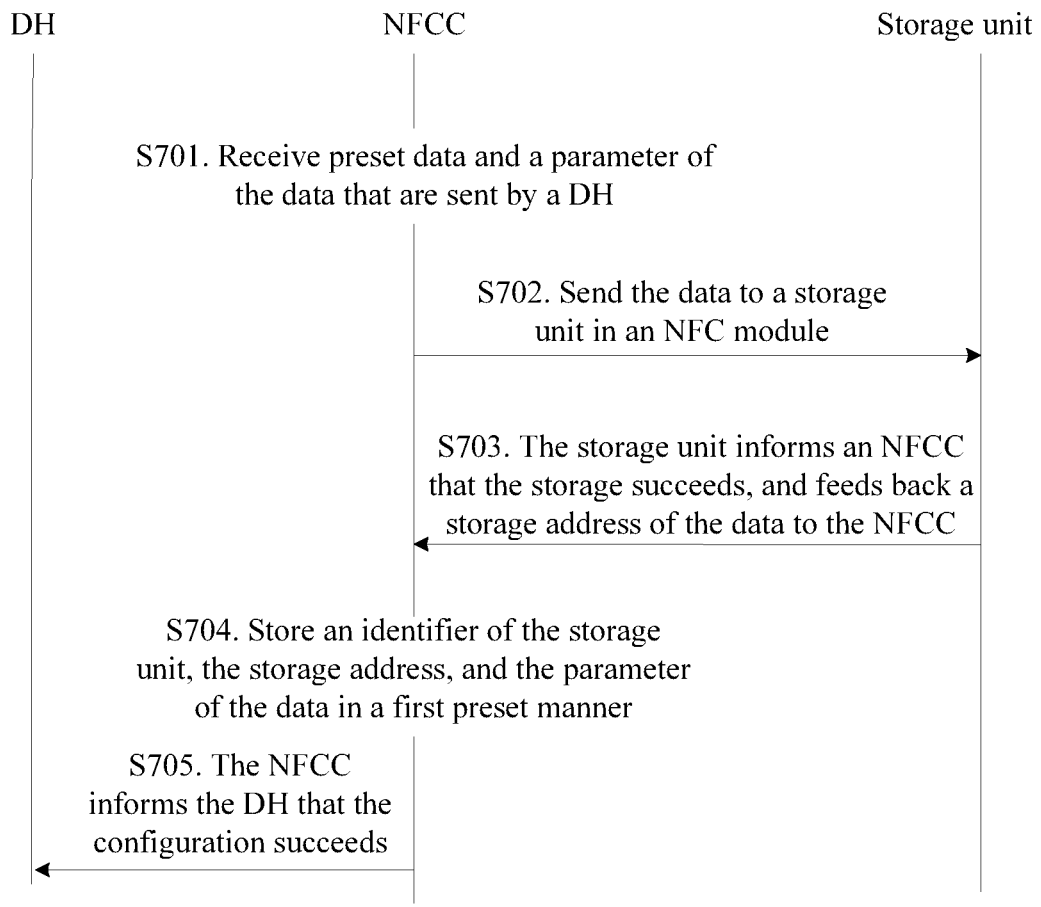
FIG. 7 is a flowchart of an implementation manner in which an NFC module receives and stores preset data and a parameter of the data in the another NFC configuration method disclosed by an embodiment of the present invention.

As shown in FIG. 7, one implementation manner in which the NFC module receives and stores preset data and a parameter of the data includes the following steps.

S701. An NFCC receives the preset data and the parameter of the data that are sent by a DH.

S702. The NFCC sends the data to a storage unit in the NFC module.

Preferably, the storage unit in the NFC module is an SE or a storage unit in the NFCC.

S703. The storage unit informs the NFCC that the storage succeeds and feeds back a storage address of the data to the NFCC.

S704. The NFCC stores an identifier of the storage unit, the storage address, and the parameter of the data in a first preset manner.

S705. The NFCC informs the DH that the configuration succeeds.

Preferably, the NFCC may correspondingly store the identifier of the storage unit, the storage address, and the parameter of the data in a list method, for example, in a form of Table 1.

SEID is an identifier of a storage unit, SE1, SE2, SE3, and SE4 are specific storage units, and Addr1, Addr2, Addr3, and Addr4 are specific storage addresses.

When the data is Java Applet, a Data parameter is an identifier of the Java Applet.

That is, after the NFCC receives the data and the parameter of the data that are sent by the DH, and the NFCC exchanges with the storage unit in the NFC module, it is implemented that the data and the parameter of the data are stored.

Figure 8:
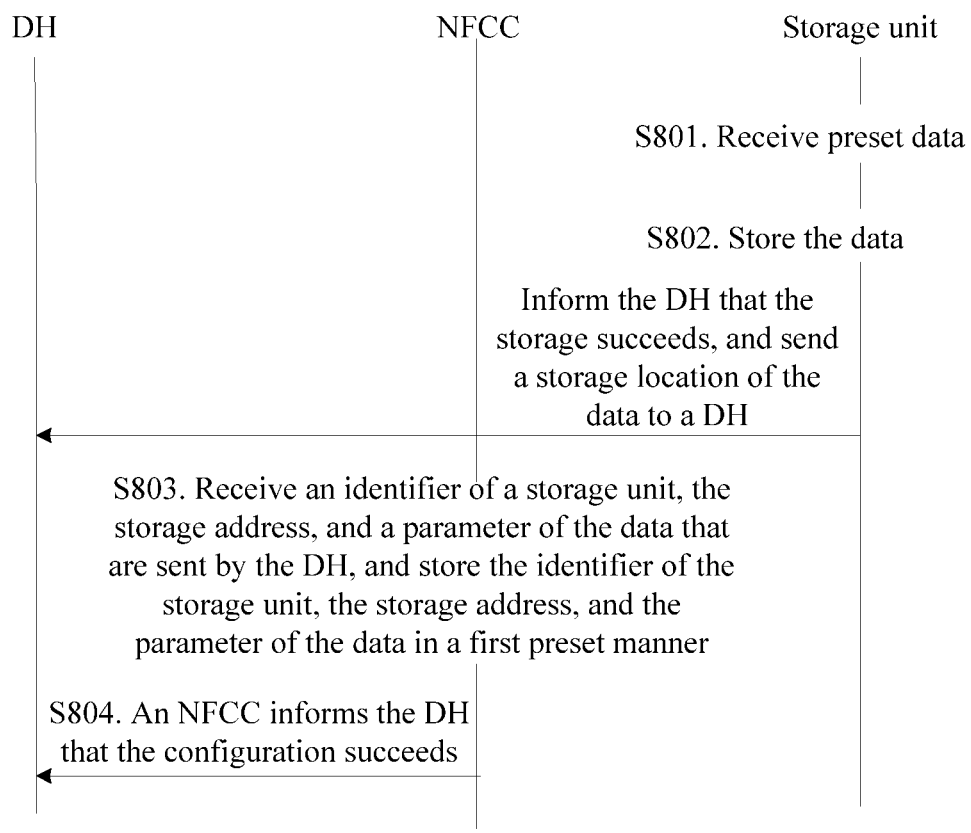
FIG. 8 is a flowchart of another implementation manner in which an NFC module receives and stores preset data and a parameter of the data in the another NFC configuration method disclosed by an embodiment of the present invention.

As shown in FIG. 8, another implementation manner in which the NFC module receives and stores preset data and a parameter of the data includes the following steps.

S801. A storage unit in the NFC module receives the preset data.

S802. The storage unit stores the data, informs a DH that the storage succeeds, and sends a storage address of the data to the DH.

S803. An NFCC receives an identifier of the storage unit, the storage address, and the parameter of the data that are sent by the DH and stores the identifier of the storage unit, the storage address, and the parameter of the data in a first preset manner.

A specific storage manner may be shown in Table 1.

S804. The NFCC informs the DH that the configuration succeeds.

A difference from the previous implementation manner is that, in this implementation manner, the storage unit directly exchanges with the DH, and after the storage address is determined, the NFCC receives the storage address, the identifier of the storage unit, and the parameter of the data that are sent by the DH.

Returning to FIG. 6, S602. Receive a storage space application instruction and determine storage space according to the instruction, where the storage space application instruction is sent by a controller of the electronic device after an LLCP link parameter is configured.

Figure 9:
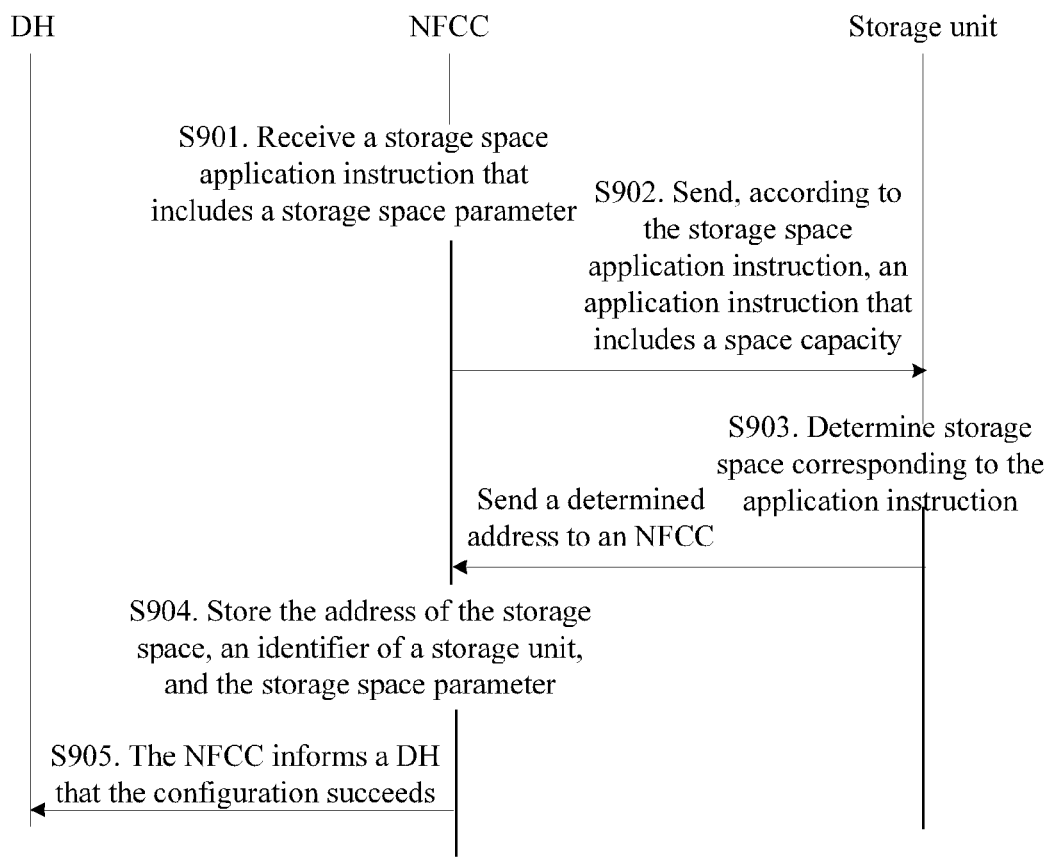
FIG. 9 is a flowchart of an implementation manner in which an NFC module receives a storage space application instruction, and determines storage space according to the instruction in the another NFC configuration method disclosed by an embodiment of the present invention.

As shown in FIG. 9, an implementation manner in which the NFC module receives a storage space application instruction and determines storage space according to the instruction includes the following steps.

S901. An NFCC in the NFC module receives the storage space application instruction that includes a storage space parameter.

The storage space parameter includes a space capacity and an SAP, and preferably, may further include an LSC.

S902. The NFCC sends, according to the storage space application instruction, an application instruction that includes a space capacity to an SE or a storage unit in the NFCC.

The space capacity in this step may be obtained from the storage space parameter.

S903. The SE or the storage unit in the NFCC determines the storage space corresponding to the application instruction and sends an address of the determined storage space to the NFCC.

A capacity of the storage space is the same as the space capacity included in the application instruction.

S904. The NFCC stores the address of the storage space, an identifier of the storage unit, and the storage space parameter.

S905. The NFCC informs the DH that the configuration succeeds.

TABLE 1

| SAP | LSC | SEID | Data | In/Out |
|---|---|---|---|---|
| Contacts (contact) | CO/CL (two connection types are supported) | SE1 | Addr1 | Out |
| SMS (SMS message) | CO/CL (two connection types are supported) | SE2 | Addr2 | Out |
| Photo (photo) | CO/CL (two connection types are supported) | SE3 | Addr3 | Out |
| Coupon (coupon) | CO (only connection-oriented is supported) | SE4 | Addr4 | Out |

Figure 10:
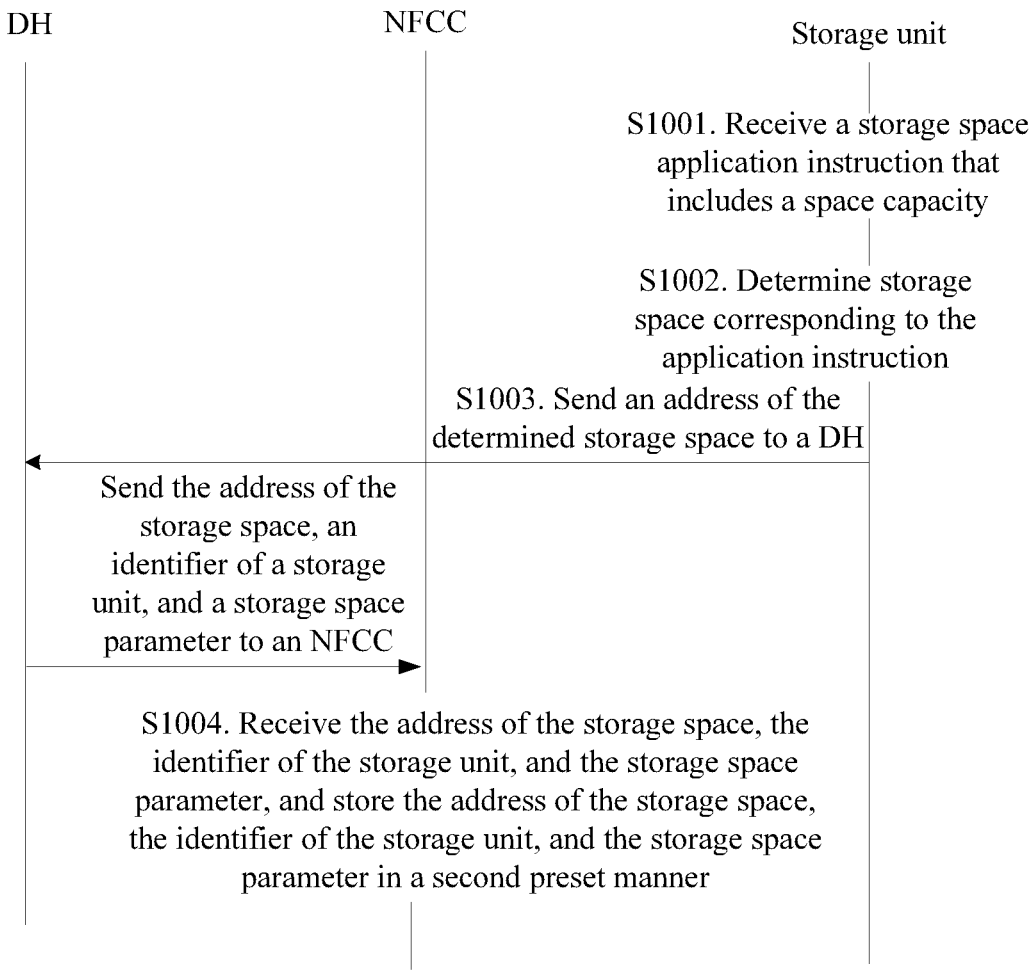
FIG. 10 is a flowchart of another implementation manner in which an NFC module receives a storage space application instruction, and determines storage space according to the instruction in the another NFC configuration method disclosed by an embodiment of the present invention.

As shown in FIG. 10, another implementation manner in which the NFC module receives a storage space application instruction and determines storage space according to the instruction includes the following steps.

S1001. A storage unit in the NFC module receives the storage space application instruction that includes a space capacity.

The storage unit in the NFC module is preferably an SE or a storage unit in an NFCC.

S1002. The storage unit determines the storage space corresponding to the application instruction.

S1003. The storage unit sends an address of the determined storage space to a DH.

After receiving the address of the storage space, the DH sends the address of the storage space, an identifier of the storage unit, and a storage space parameter to the NFCC.

S1004. The NFCC receives the address of the storage space, an identifier of the storage unit, and a storage space parameter, and stores the address of the storage space, the identifier of the storage unit, and the storage space parameter in a second preset manner.

The second preset manner may be shown in Table 2. A difference from Table 1 is that, in Table 2, SAP may further be any type, and In/Out is storage rather than output.

TABLE 2

| SAP | LSC | SEID | Data | In/Out |
|---|---|---|---|---|
| Contacts (contact) | CO/CL (two connection types are supported) | SE1 | Addr1 | storage |
| SMS (SMS message) | CO/CL (two connection types are supported) | SE2 | Addr2 | storage |
| Photo (photo) | CO/CL (two connection types are supported) | SE3 | Addr3 | storage |
| Any type | CL (only connectionless is supported) | SE4 | Addr4 | storage |

S1005 (not shown). The NFCC informs the DH that the configuration succeeds.

The NFC configuration method in this embodiment is mainly described using an NFC module as an object. An NFCC and a storage unit in the NFC module cooperate to store data and a parameter of the data that are sent by a DH or reserve storage space applied for by a DH. Therefore, during a subsequent NFC data transmission procedure, participation of the DH is no longer required, and NFC data transmission can be implemented out of control of the DH. As a result, when the DH cannot work, the NFC data transmission is not affected.

Figure 11:
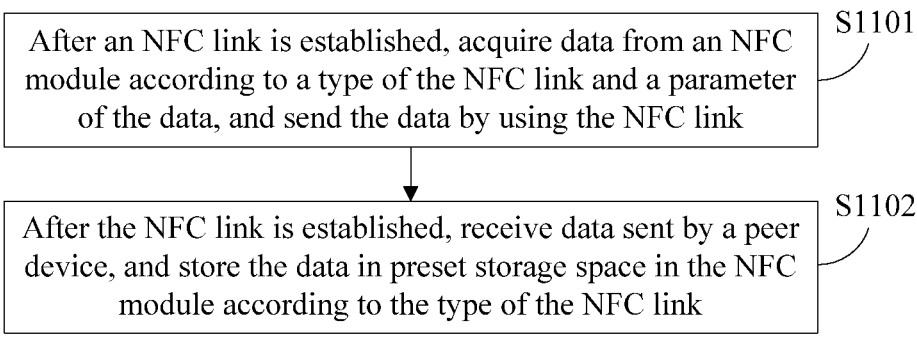
FIG. 11 is a flowchart of an NFC data transmission method disclosed by an embodiment of the present invention.

Based on the foregoing NFC configuration method, an embodiment of the present invention discloses an NFC data transmission method that is applied to an NFCC in an NFC module of an electronic device. As shown in FIG. 11, the method includes at least one of the following steps.

S1101. After an NFC link is established, acquire data from the NFC module according to a type of the NFC link and a parameter of the data and send the data using the NFC link, where the data and the parameter of the data are sent to the NFC module of the electronic device by a controller of the electronic device after an LLCP link parameter is configured, and the data and the parameter of the data are stored by the NFC module.

That is, before NFC data transmission, the data and the parameter of the data are stored in the NFC module in advance by the DH. The procedure of storing the data and the parameter of the data in the NFC module is a configuration stage for the NFC data transmission. Reference may be made to the embodiment of the foregoing NFC configuration method, and details are not described herein again.

Figure 12:
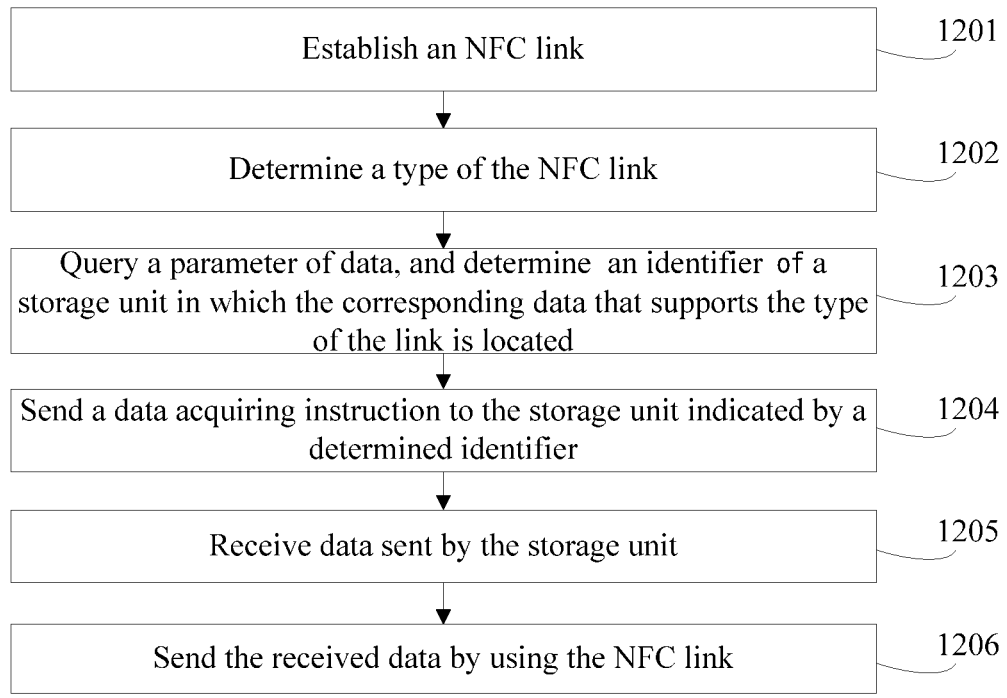
FIG. 12 is a flowchart of a data sending method in the NFC data transmission method disclosed by an embodiment of the present invention.

As shown in FIG. 12, S1101 may include the following steps.

S1201. Establish the NFC link.

An NFC link establishment procedure in this embodiment is the same as that in the prior art, and details are not described herein again. Generally, according to a service class, the NFC link may be classified into a CL type, a CO type, and CL/CO.

S1202. The NFCC determines the type of the NFC link.

That is, whether the NFC link is CL, CO, or CL/CO is determined.

S1203. The NFCC queries the parameter of the data and determines a storage unit in which the corresponding data that supports the type of the link is located.

The parameter of the data is sent by the DH to the NFC module for storage at a configuration stage. In this embodiment, an identifier of a storage unit in which data corresponding to a type of a current NFC link is located and a storage address may be queried from the foregoing Table 1. When data is Java Applet, an identifier of a storage unit in which the Java Applet corresponding to a type of a current NFC link is located and an identifier of the Java Applet may be queried from the foregoing Table 1.

When a type of the NFC link is CL or CL/CO, Table 1 is queried, and it is determined that a type of a link that data in storage addresses corresponding to SE1, SE2, and SE3 supports is the same as the type of the NFC link, that is, the type of the current link is supported. When a type of the NFC link is CO, Table 1 is queried, and when an identifier of a storage unit and a storage address are determined, an SAP type is further used as a basis, in addition to a basis that LSC is CO, where the SAP type that is used as a basis is sent by a peer device at an NFC link establishment stage. For example, if Contacts sent by the peer device is received, when an identifier of a storage unit and an address are queried, that both CO and Contacts must be met is used as a basis.

S1204. The NFCC sends a data acquiring instruction to the storage unit indicated by the determined identifier.

It should be noted that, if data in the storage unit is data only and does not include an instruction, the storage unit directly sends the original data to the NFCC according to an instruction. If data in the storage unit is data that includes a logical instruction, a to-be-sent data packet is generated according to the logical instruction, and the to-be-sent data packet is sent to the NFCC.

S1205. The NFCC receives the data sent by the storage unit.

In this embodiment, the storage unit in the NFC module is also preferably an SE or a storage unit in the NFCC. The NFCC may acquire data from one, two, or more storage units.

S1206. The NFCC sends the received data using the NFC link.

It should be noted that, if the received data is original data that is directly sent by the storage unit to the NFCC according to an instruction, the NFCC converts the data into a data packet that meets an LLCP standard and sends the data packet using the NFC link. If the received data is a to-be-sent data packet generated according to a logical instruction, the NFCC directly sends the to-be-sent data packet using the NFC link.

Returning to FIG. 11, S1102. After the NFC link is established, receive data sent by a peer device and store the data in preset storage space in the NFC module according to the type of the NFC link.

The preset storage space is determined by the NFC controller according to a received storage space application instruction that is sent by the controller of the electronic device after the LLCP link parameter is configured.

Figure 13:
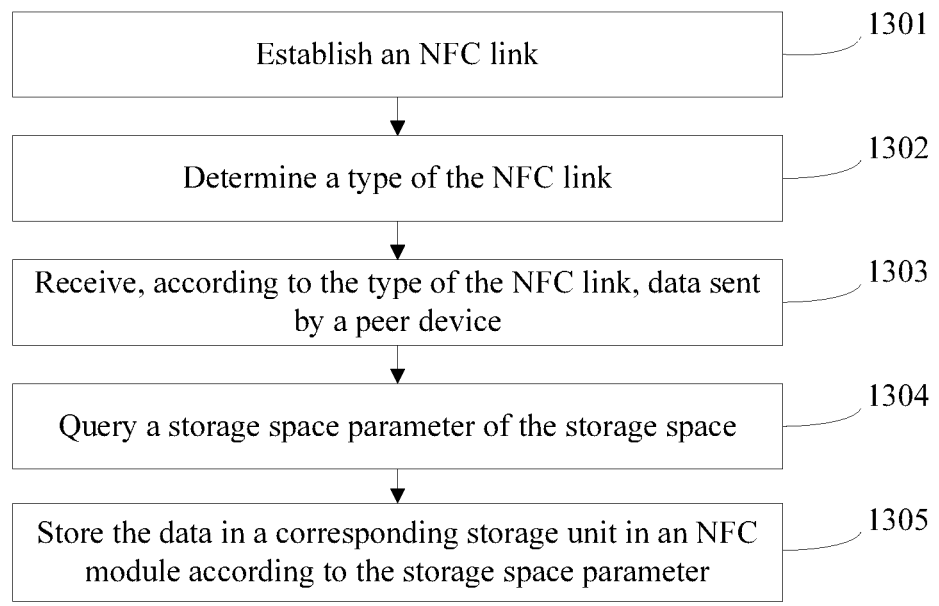
FIG. 13 is a flowchart of a data receiving method in the NFC data transmission method disclosed by an embodiment of the present invention.

As shown in FIG. 13, the procedure of receiving data sent by a peer device and storing the data in preset storage space in the NFC module according to the type of the NFC link includes the following steps.

S1301. Establish the NFC link.

S1302. Determine the type of the NFC link.

S1303. Receive, according to the type of the NFC link, the data sent by the peer device.

If the type of the NFC link is CO, an SAP of the data needs to be matched with that of the peer device, and then data is received. If the type of the NFC link is CL or CL/CO, the data may be directly received without a matching procedure.

S1304. Query a storage space parameter of the storage space.

The storage space parameter is stored in a storage unit in the NFC module at a configuration stage. For the storage space parameter in this embodiment, reference may be made to the foregoing Table 2.

S1305. Store the data in a corresponding storage unit in the NFC module according to the storage space parameter.

That is, according to the items in Table 2, the data is stored in a storage unit whose parameters match all the items. For example, if received data is a photo and supports CL/CO, the data may be stored in SE3 whose address is Addr3.

It should be noted that, if an SAP that matches data is not found, the data may be stored in storage space whose SAP is any type.

In the prior art, in an NFC data transmission procedure, a procedure involving application-layer data sending or receiving requires participation of a DH. Therefore, when an electric quantity of an electronic device is not enough to support the DH in working, an NFC module cannot transmit data.

According to the NFC data transmission method in this embodiment, because both to-be-transmitted data and a parameter of the data are stored in an NFC module in advance, or storage space for storing received data is set in an NFC module in advance, a DH is not required to participate in a data transmission procedure. Therefore, even if the DH cannot work due to a low electric quantity, when communicating with a peer NFC device, the NFC module can obtain electricity from an electric field generated by means of radiation by the peer NFC device, and therefore can transmit data in a case in which local electricity is not enough.

It can be seen that, according to the NFC data transmission method in this embodiment, participation of a DH is not required, which can reduce load of the DH. In addition, a restriction by an electric quantity of an electronic device is lifted, which brings convenience for a user.

Corresponding to the foregoing method embodiment, an embodiment of the present invention further discloses a control apparatus that is applied to an electronic device and includes an NFC configuring module configured to, after a controller of the electronic device configures an LLCP link parameter, send preset data and a parameter of the data to an NFC module of the electronic device so that the NFC module stores the data and the parameter of the data; and/or, after the controller of the electronic device configures the LLCP link parameter, send a storage space application instruction to the NFC module so that the NFC module determines storage space for received data according to the instruction.

Further, the NFC configuring module may be a first NFC controller interaction unit configured to send the preset data to an NFC controller in the NFC module so that the NFC controller sends the data to a storage unit in the NFC module for storage and send the parameter of the data to the NFC controller so that the NFC controller stores the parameter of the data; or a first storage unit interaction unit configured to send the preset data to a storage unit in the NFC module so that the storage unit stores the data and sends a storage address of the data to the controller of the electronic device and send the received storage address fed back by the storage unit, an identifier of the storage unit, and the parameter of the data to an NFC controller so that the NFC controller stores the identifier of the storage unit, the storage address and the parameter of the data; or a second NFC controller interaction unit configured to send the storage space application instruction that includes a storage space parameter to an NFC controller in the NFC module so that the NFC controller applies to a storage unit in the NFC module for the storage space; or a second storage unit interaction unit configured to send the storage space application instruction that includes a space capacity to a storage unit in the NFC module so that the storage unit determines the storage space corresponding to the application instruction; receive an address of the determined storage space fed back by the storage unit; and send an identifier of the storage unit, the storage address, and a storage space parameter to an NFC controller so that the NFC controller receives and stores the identifier of the storage unit, the storage address, and the storage space parameter that are sent by the controller of the electronic device.

In this embodiment, the storage unit is preferably an SE or a storage unit of an NFCC.

Figure 14:
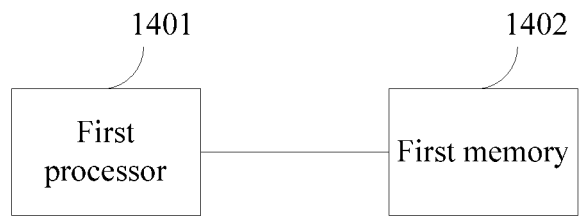
FIG. 14 is a schematic structural diagram of a controller disclosed by an embodiment of the present invention.

An embodiment of the present invention further discloses a controller. As shown in FIG. 14, the controller includes a first processor 1401 configured to, after the controller of an electronic device configures an LLCP link parameter, send preset data and a parameter of the data to an NFC module of the electronic device so that the NFC module stores the data and the parameter of the data; and/or, after the controller of the electronic device configures the LLCP link parameter, send a storage space application instruction to the NFC module so that the NFC module determines storage space for received data according to the instruction; and a first memory 1402 configured to store a program in the first processor 1401 and data that is generated when the program in the first processor 1401 runs.

An embodiment of the present invention further provides an NFC apparatus that is applied to an electronic device and includes a configuration response module configured to receive and store preset data and a parameter of the data, where the preset data and the parameter of the data are sent by a controller of the electronic device after an LLCP link parameter is configured; and/or configured to receive a storage space application instruction and determine storage space for received data according to the instruction, where the storage space application instruction is sent by the controller of the electronic device after the LLCP link parameter is configured.

Further, the configuration response module may include at least one of the following: a first NFC controller configured to receive the preset data and the parameter of the data and send the data; and a first storage unit configured to receive and store the data sent by the first NFC controller and send a storage address of the data to the first NFC controller so that the first NFC controller stores an identifier of the storage unit, the storage address, and the parameter of the data in a first preset manner; or a second storage unit configured to receive and store the preset data and send a storage address of the data to the controller of the electronic device so that the controller of the electronic device sends the storage address of the data to a second NFC controller; and the second NFC controller configured to receive an identifier of the storage unit, the storage address, and the parameter of the data that are sent by the controller of the electronic device and store the identifier of the storage unit, the storage address, and the parameter of the data in a first preset manner; or a third NFC controller configured to receive the storage space application instruction that includes a storage space parameter and send, according to the storage space application instruction, an application instruction that includes a space capacity to a storage unit in the NFC module; and a third storage unit configured to determine storage space corresponding to the application instruction and send an address of the determined storage space to the third NFC controller so that the third NFC controller stores the address of the storage space, an identifier of the storage unit, and the storage space parameter in a second preset manner; or a fourth storage unit configured to receive the storage space application instruction that includes a space capacity, determine storage space corresponding to the application instruction, and send an address of the determined storage space to the controller of the electronic device so that the controller of the electronic device sends an identifier of the storage unit, the storage address, and a storage space parameter to the NFC module; and a fourth NFC controller configured to receive the identifier of the storage unit, the storage address, and the storage space parameter that are sent by the controller of the electronic device and store the identifier of the storage unit, the storage address, and the storage space parameter in a second preset manner.

Figure 15:
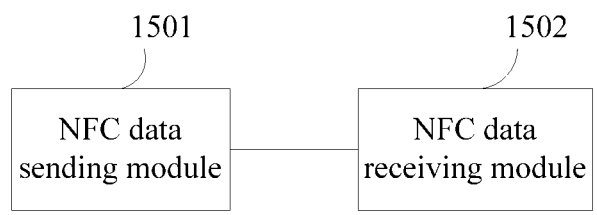
FIG. 15 is a schematic structural diagram of an NFC control apparatus disclosed by an embodiment of the present invention.

An embodiment of the present invention further discloses an NFC control apparatus that is applied to an NFC module of an electronic device. As shown in FIG. 15, the apparatus includes at least one of the following: an NFC data sending module 1501 configured to, after an NFC link is established, acquire data from the NFC module according to a type of the NFC link and a parameter of the data and send the data using the NFC link, where the data and the parameter of the data are sent to the NFC module of the electronic device by a controller of the electronic device after an LLCP link parameter is configured, and the data and the parameter of the data are stored by the NFC module; and an NFC data receiving module 1502 configured to, after the NFC link is established, receive, according to the type of the NFC link, data sent by a peer device and store the data in preset storage space in the NFC module, where the preset storage space is determined by the NFC controller according to a received storage space application instruction that is sent by the controller of the electronic device after the LLCP link parameter is configured.

Further, the NFC data sending module 1501 includes a first determining unit configured to determine the type of the NFC link; a second querying unit configured to query the parameter of the data and determine an identifier of a storage unit in which the corresponding data that supports the type of the link is located; a sending unit configured to send a data acquiring instruction to the storage unit indicated by the determined identifier; and a first receiving unit configured to receive the data sent by the storage unit.

The NFC data receiving module 1502 includes a second determining unit configured to determine the type of the NFC link; a second receiving unit configured to receive, according to the type of the NFC link, the data sent by the peer device; a second querying unit configured to query a storage space parameter of the storage space; and a storage unit configured to store the data in a corresponding storage unit in the NFC module according to the storage space parameter.

Figure 16:
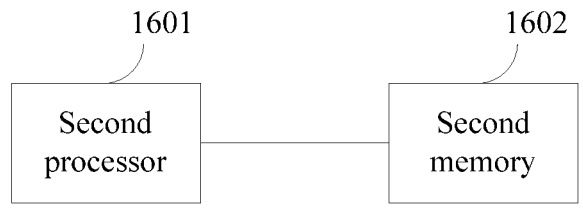
FIG. 16 is a schematic structural diagram of an NFC controller disclosed by an embodiment of the present invention.

An embodiment of the present invention further discloses an NFC controller. As shown in FIG. 16, the NFC controller includes a second processor 1601 configured to, after an NFC link is established, acquire data from the NFC module according to a type of the NFC link and a parameter of the data and send the data using the NFC link, where the data and the parameter of the data are sent to the NFC module of the electronic device by a controller of the electronic device after an LLCP link parameter is configured, and the data and the parameter of the data are stored by the NFC module; and/or, after the NFC link is established, receive, according to the type of the NFC link, data sent by a peer device and store the data in preset storage space in the NFC module, where the preset storage space is determined by the NFC controller according to a received storage space application instruction that is sent by the controller of the electronic device after the LLCP link parameter is configured; and a second memory 1602 configured to store a program in the second processor 1601 and data that is generated when the program in the second processor runs.

When the functions of the methods in the embodiments are implemented in the form of a software functional unit and sold or used as an independent product, the functions may be stored in a computing device—readable storage medium. Based on such an understanding, the part of the embodiments of the present invention contributing to the prior art or some of the technical solutions may be implemented in a form of a software product. The software product is stored in a storage medium and includes several instructions for instructing a computing device (which may be a personal computer, a server, a mobile computing device, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments.

The foregoing description of the disclosed embodiments enables a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. A near field communication (NFC) data transmission method, the method comprising:
    establishing, by an NFC controller of an electronic device, an NFC link between the electronic device and an NFC device;
    determining, by the NFC controller, a value of an identifier of a storage space and a value of an address of the storage space based on a relationship and a Link Service Class (LSC) of the established NFC link, wherein the relationship linking the address of the storage space, the identifier of the storage space, a type of application-layer data, and a LSC supported by the type of application-layer data, wherein the relationship is stored in the NFC controller, and wherein the storage space is located in the NFC controller;
    sending, by the NFC controller, a data acquisition instruction to the storage space identified by the value of the address of the storage space and the value of the identifier of the storage space;
    receiving, by the NFC controller, an application-layer data sent by the identified storage space; and
    sending, by the NFC controller, the application-layer data to the NFC device via the NFC link.

2. The method according to claim 1, wherein the LSC is one of connectionless and connectionless/connection-oriented.

3. The method according to claim 1, wherein before establishing the NFC link between the electronic device and the NFC device, the method further comprises:
    receiving, by the NFC controller, the application-layer data and the LSC supported by the type of application-layer data from a controller of the electronic device;
    storing, by the NFC controller, the application-layer data in the storage space; and
    storing, by the NFC controller, in the NFC controller, the relationship linking the address of the storage space, the identifier of the storage space, the type of application-layer data, and the LSC supported by the type of application-layer data.

4. The method according to claim 1, wherein the type of application-layer data is Service Access Point (SAP).

5. The method according to claim 1, wherein determining the value of the identifier of the storage space and the value of the address of the storage space comprises determining, by the NFC controller, the value of the identifier of the storage space and the value of the address of the storage space based on the relationship, the LSC of the established NFC link and the type of application-layer data required by the NFC device when the LSC is connection-oriented.

6. The method according to claim 5, wherein the type of application-layer data is Service Access Point (SAP).

7. A near field communication (NFC) control device, comprising:
    an NFC controller comprising:
        a processor;
        a memory coupled to the processor;
        a transmitter coupled to the processor; and
        a receiver coupled to the processor,
    wherein the memory is configured to store application-layer data,
    wherein the processor is configured to:
        establish an NFC link between the NFC control device and an NFC device;
        determine a value of an identifier of a storage space and a value of an address of the storage space based on a relationship and a Link Service Class (LSC) of the established NFC link, wherein the relationship linking the address of the storage space, the identifier of the storage space, a type of application-layer data, and a LSC supported by the type of application-layer data, wherein the relationship is stored in the memory,
    wherein the transmitter is configured to send a data acquisition instruction to the storage space identified by the value of the address of the storage space and the value of the identifier of the storage space,
    wherein the receiver is configured to receive an application-layer data sent by the storage space, and
    wherein the transmitter is configured to send the application-layer data to the NFC device via the NFC link.

8. The device according to claim 7, wherein the LSC is one of connectionless and connectionless/connection-oriented.

9. The device according to claim 7, wherein the receiver is further configured to receive the application-layer data and the LSC supported by the application-layer data from another part of the device, and wherein the memory is further configured to:
    store the application-layer data in the storage space; and
    store the relationship linking the address of the storage space, the identifier of the storage space, the type of application-layer data, and the LSC supported by the type of application-layer data.

10. The device according to claim 7, wherein the type of application-layer data is Service Access Point (SAP).

11. The device according to claim 7, wherein when the processor determines the value of the identifier of the storage space and the value of the address of the storage space, the processor is further configured to determine the value of the identifier of the storage space and the value of the address of the storage space based on the relationship, the LSC of the established NFC link and the type of application-layer data required by the NFC device when the LSC is connection-oriented.

12. The device according to claim 11, wherein the type of application-layer data is Service Access Point (SAP).

* * * * *